United States Patent
Barker et al.

[11] Patent Number: 5,706,682
[45] Date of Patent: Jan. 13, 1998

[54] VEHICLE SAFETY AND SECURITY DEVICE REMOVABLY MOUNTABLE TO SURROUND A VEHICLE TIRE

[76] Inventors: J. W. Barker; J. B. Barker, both of 17800 S. Main St., Unit 402, Gardena, Calif. 90248

[21] Appl. No.: 551,296

[22] Filed: Oct. 31, 1995

Related U.S. Application Data

[63] Continuation-in-part of Ser. No. 332,977, Oct. 31, 1994, abandoned.

[51] Int. Cl.⁶ .................................................. B60R 25/00
[52] U.S. Cl. .................................................. 70/226; 188/32
[58] Field of Search ........................... 70/18, 19, 232, 70/225, 226, 237, 259, 260; 188/32, 265

[56] References Cited

U.S. PATENT DOCUMENTS

| | | | |
|---|---|---|---|
| 1,396,067 | 11/1921 | Setkowski | 70/225 |
| 3,695,071 | 10/1972 | West | 70/225 |
| 4,649,724 | 3/1987 | Raine | 70/225 X |
| 4,854,144 | 8/1989 | Davis | 70/226 |
| 4,888,969 | 12/1989 | Suroff | 70/259 X |
| 4,913,265 | 4/1990 | Richards | 188/32 |
| 5,214,944 | 6/1993 | Wolthoff | 70/226 |
| 5,333,477 | 8/1994 | Davis | 70/226 |
| 5,385,038 | 1/1995 | Walker | 70/226 X |

FOREIGN PATENT DOCUMENTS

| | | | |
|---|---|---|---|
| 1558956 | 1/1969 | France | 70/18 |
| 2620672 | 3/1989 | France | 188/32 |
| 4118340 | 4/1992 | Japan | 70/18 |
| 2110175 | 6/1983 | United Kingdom | 70/226 |

*Primary Examiner*—Lloyd A. Gall

[57] ABSTRACT

A single locking point vehicle security device having U-shaped arms which are adjustable in width to accommodate the tire width of the vehicle. The arms are non-rotatably mountable in a central body over the tread of a tire thereby rendering the wheel inoperable. The central body renders the wheel mounting to the vehicle inaccessible. The point of adjustment of the width of the U-shaped end of the arms and the attachment point of the arms to the central body are also inaccessible when the device is mounted and locked onto the wheel thereby making removal difficult. A second set of arms may be installed in the central body in place of the security arms. This second set is fabricated to have a low profile and traction enhancing surface over the tread to improve maneuverability of the vehicle on a slippery surface.

6 Claims, 10 Drawing Sheets

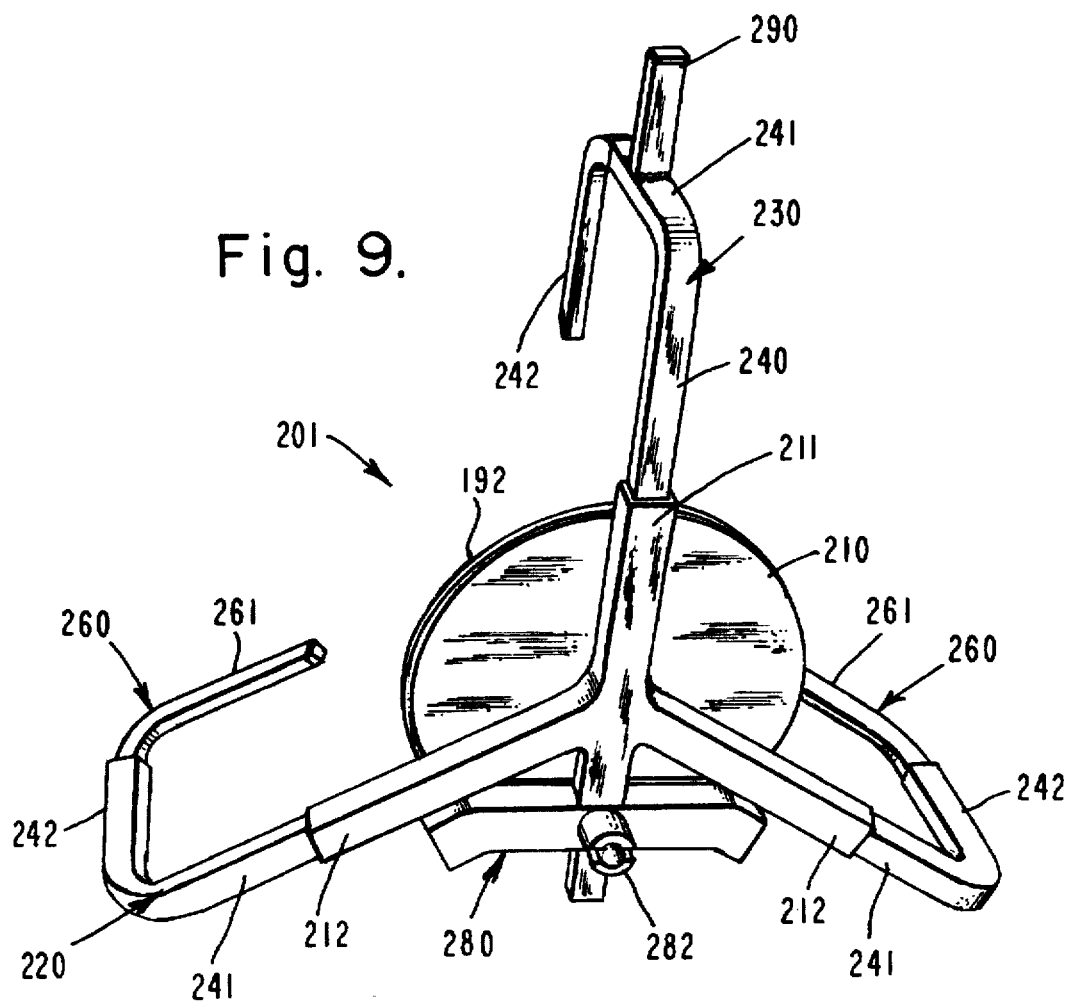

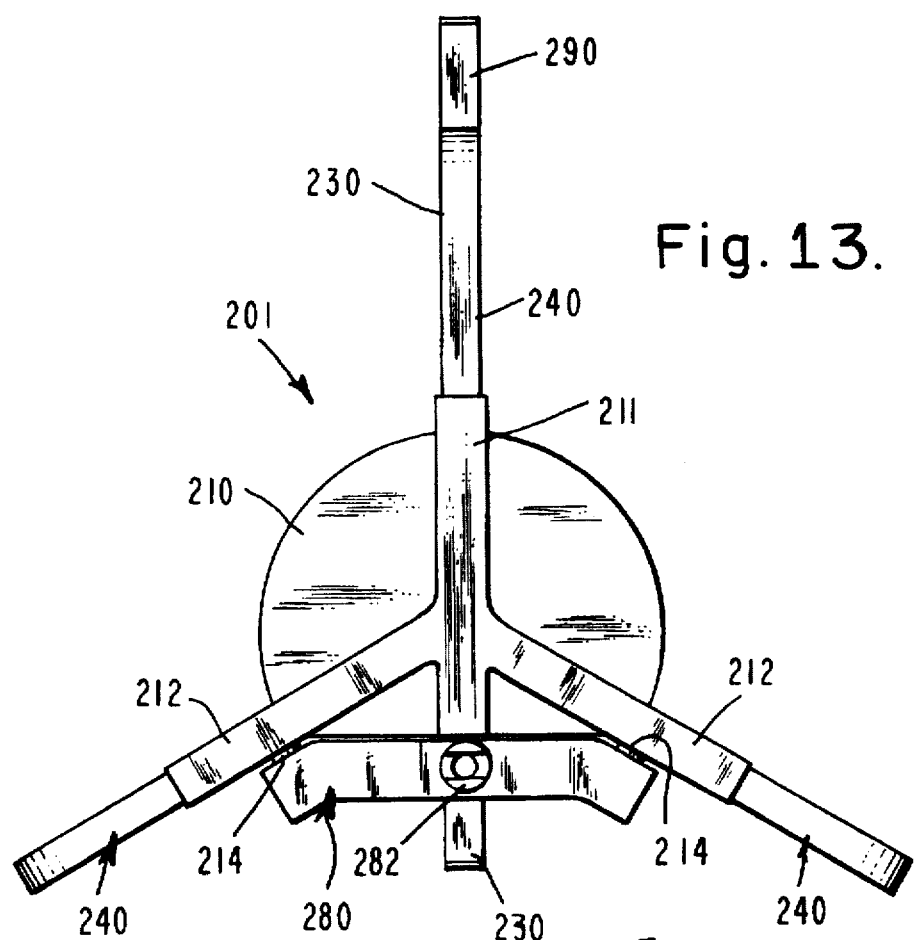
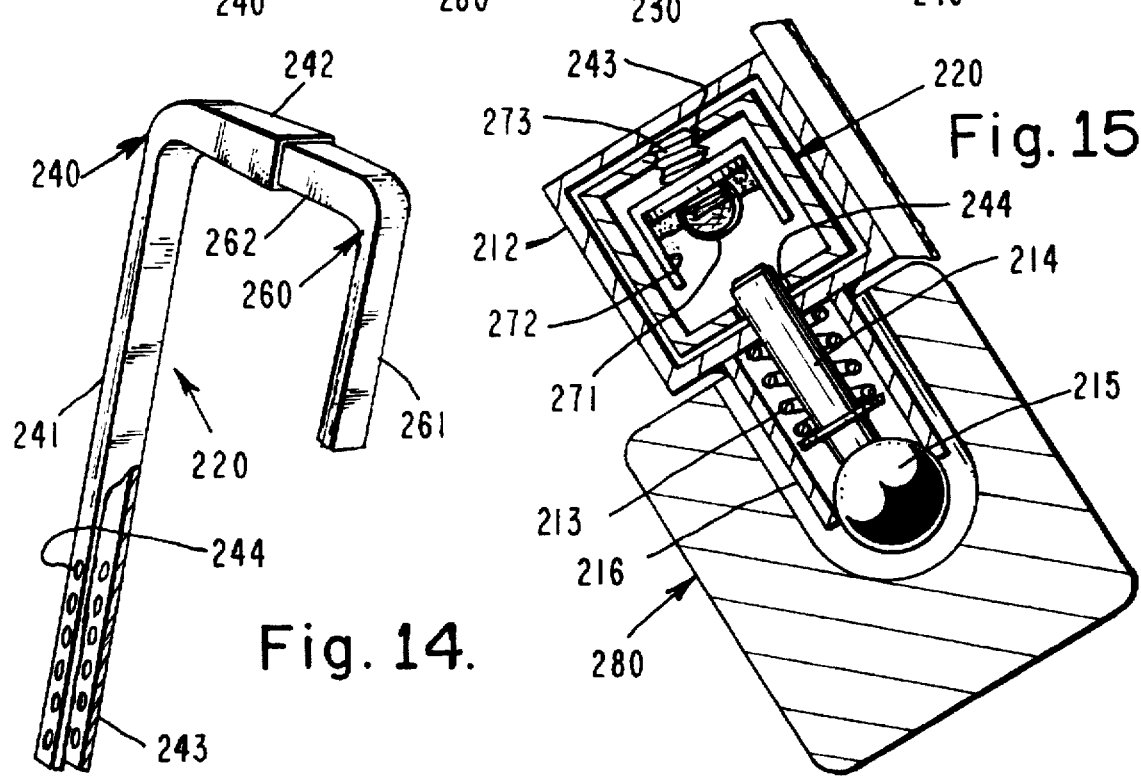
Fig. 13.
Fig. 14.
Fig. 15.

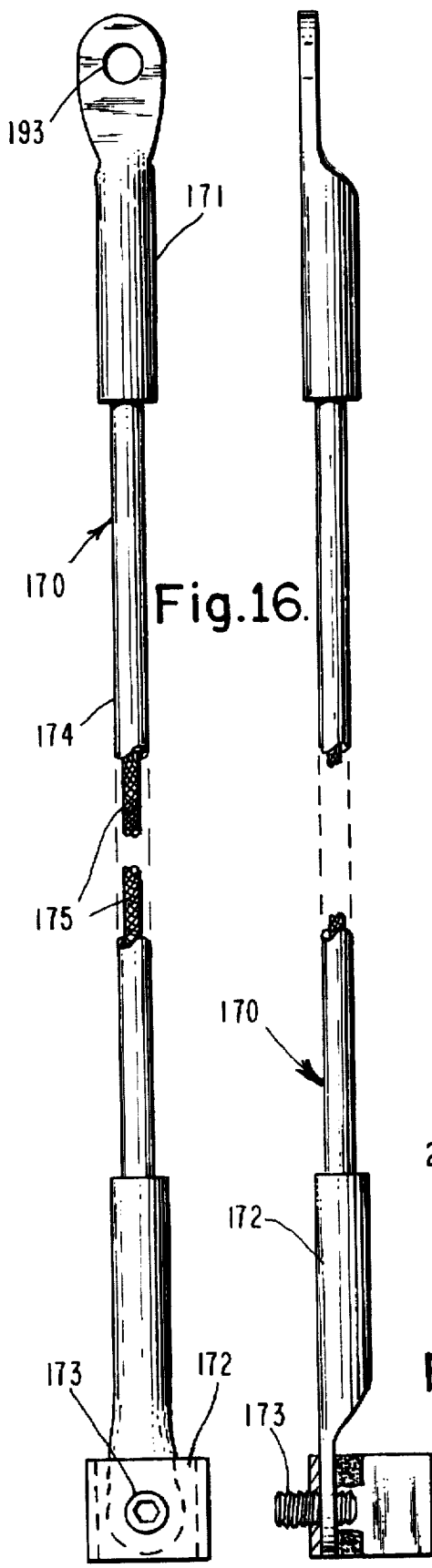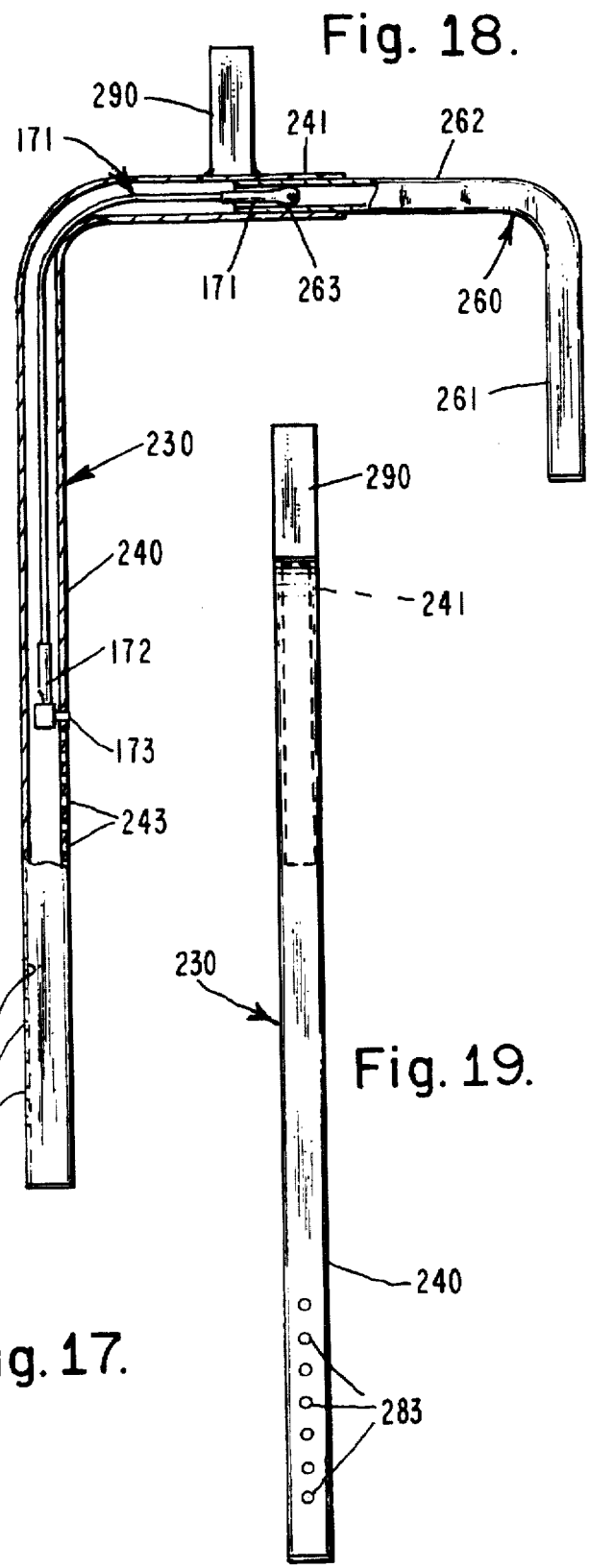

VEHICLE SAFETY AND SECURITY DEVICE REMOVABLY MOUNTABLE TO SURROUND A VEHICLE TIRE

This is a continuation in part of patent application Ser. No. 08/332,977, filed Oct. 31, 1994 which is abandoned upon the filing of this application.

BACKGROUND OF THE INVENTION

1. Field of the Invention

This invention relates to the art of vehicle security and safety and, more particularly to an improved arrangement having a set of arms which clamp onto a preselected wheel of the vehicle thereby preventing that wheel from rotating. The device may be provided with another set of arms having means to assist in increasing traction of the wheel especially for the navigation of the vehicle under icy conditions, while allowing the wheel to rotate, even with the device installed on the wheel.

2. Description of the Prior Art

U.S. Pat. No. 5,214,944 ('944) describes an arrangement which attaches over the hub of a vehicle wheel. The arrangement utilizes a number of rods hooked over the circumference of the vehicle tire. The hook is formed to fit the width of the tire.

Installation of this device is difficult as any individual hook or even grouping of two hooks cannot be used to assist in holding the central shell in place while the remaining rods are installed. All the rods are stacked on each other within the hub of the device and then held in place at a central point by compression applied by a screw-thread which is surrounded by a nut-sleeve which after the screw-thread is tightened to compress the rods it is rendered inaccessible upon the installation of a lock through the nut-sleeve of the arrangement.

Thus, the user must hold the central shell suspended during the entire installation process including the tightening of the screw-threaded locking assembly. This installation process may discourage use of such a device upon parking the vehicle.

The patent teaches that this simple compression of a stack of rods will prevent the rods from rotating.

The width of the hooks on the arms must allow a set of hooks to accommodate a limited width of tire. By the teaching of this device, the user is required to be provided a number of sets of hooks to allow the device to be universally usable over the very wide range of tire width currently in use should the user have a number of vehicles, each utilizing a different tire width size.

Unfortunately, it appears that the security device taught by this patent is easily overcome and the device removed from the vehicle tire by first venting the air from the tire on which the device is mounted and then prying on an exposed hook thereby rotating it from the position of being hooked over the circumference of the tire to the outside of the tire. Only one or two of the hooks need to be rotated in this manner to allow the entire locked device to be removed from the tire. Once this device is removed, the air may be replaced in the tire and the vehicle moved without impairment.

U.S. Pat. No. 3,695,071 ('071) teaches a method of providing a tenon-and-mortise connected arrangement of arms for immobilizing a vehicle. Three arms with U-shaped re-entrant flanges sized to fit the width of the tire of the vehicle are provided. As with '944, a multiple set of arms must be provided to allow the device to be used over the range of tire widths currently in use. A plurality of slots in two of the three arms are provided so that the installation of the arms over the tread of the tire may be adjusted to conform to the diameter of the vehicle tire. The U-shaped flanges of these two arms are each fitted with a triangle shaped chock. Because the tenon engages the slots, these arms are prevented from being rotated in an attempt to remove the device from the tire even if the tire is deflated. However, the position of the tenon is adjustable by engaging two allen headed cap screws through an elongated slot on the third arm into a plate upon which the tenon is mounted. Should the cap screws not be tightly secured, sufficient force could be applied to this third arm thereby moving it vertically by an amount to allow the U-shaped flange to be disengaged from the tread. If the tire is then raised, the tire may be disengaged from the other two arms of the restraining device thereby allowing the tire to freely rotate.

This device appears to be a bit easier to install than '944 once the positioning of the tenon is made. The arm with the vertical slot may be installed first by hanging it on the tire thereby eliminating the requirement to suspend parts while the entire device is assembled. The other two arms with the chocks welded to the arm must be maneuvered to engage the re-entrant ears behind the tire while pushing the arm onto the exposed tenon. It appears that the position of the tenon will vary as a function of tire temperature and air pressure for each installation exercise. Re-adjustment of the position of the tenon so that the second and third arms are aligned would be unacceptable and prone to cause a loose fitting tenon plate.

U.S. Pat. No. 4,913,265 ('265) attempts to solve the problems by providing a single carrier plate with two arms pivotally attached thereto which are to be maintained in position upon the insertion of the third arm. The entire device must still be held suspended while alignment of the locking holes is achieved and the locking device is inserted. This device appears to solve the problem of rotatable legs and is adjustable to tires of different diameters. But it does not solve the problem of being adaptable to tires of different width. Further, the pivot mounting of the two legs to the carrier plate appears to act as a fulcrum to allow pressure to be applied to a hook portion of an arm thereby allowing the end remote from the hook to slide past the non-pivoted arm to a location where the entire device may be removed from the wheel. '265 expressly teaches the need for different sizes of the device for different sized wheels in terms of width.

Thus there has long been a need for an arrangement in which the width of the U-shaped end or hooks which are installed over the tread of the vehicle tire may be adjusted to allow the device to be utilized over the range of tire widths presently on the market. The teaching of the prior art of providing a set of arms for an immobilizing device, each of which may be used for only a limited range of tire widths increases the amount of inventory which must be stocked to meet the individual needs of the user.

There has long been a need for a security arrangement which is easy for the user to install on a vehicle tire without requiring the user to hold the central body while inserting the arms.

Further, there has long been a need for a device usable by parking control agencies whereby the agent in the field is not required to have access to a numerous set of arms having different hook widths in order to apply an immobilizing device to a "random sized" vehicle tire width.

It is also desired that, in order to allow the device to be transferred from vehicle to vehicle, the U-shaped hook be adjustable in width to accommodate the range of tire widths in use without requiring another set of hooks.

It is further desired that the device be designed for ease of installation including parts which are fabricated to be light weight but strong to provide good security.

After the device is installed it is desired that each of the arms be positively anchored to provide anti-rotation of arms and not to allow any possible prying away of the arms from their desired position.

SUMMARY OF THE INVENTION

Accordingly, it is an object of the present invention to provide an improved security device with a plurality of arms installed over the tread of the tire mounted on a vehicle. The width of the U-shaped end or hooks of the arms are adjustable to accommodate the width of tires most used for vehicles. This is most accommodating to parking enforcement agencies.

It is another object of this invention to allow easy installation over a vehicle tire by providing a device which is light weight so as not to create a device which become unmanageable during assembly.

It is yet another object that after the device is installed the arms be positively anchored to provide anti-rotation of arms and not to allow any possible prying away of the arms from their desired position.

The above and other objects of the present invention are achieved, according to a preferred embodiment thereof, by providing an improved security device with adjustable width U-shaped ends of each arm surround. The arms are fabricated of a non-rotatable cross-section engagable in matching cross-sectional channels of a central body.

In the preferred embodiment, the application of a shield covering the handles of spring loaded retainer pins holding two of the surrounds and one pin lock securing the shield to the third surround and to the central body increases ease of installation and removal of the device. Upon first adjusting the width of each U-shaped end of each arm surround, two surrounds may be inserted into the central body and retained by pins to accommodate the circumference of the wheel. These two arms may be installed on the wheel, the weight of the partially assembled device being held mostly by the wheel, the third arm, a locking surround, being easily installed through the central body. The shield may now be slipped over the free end of the locking surround and brought in contact with the central body to cover the retaining pins holding the other two surrounds. One pin lock is inserted through the shield to secure the shield onto the locking surround and central body.

BRIEF DESCRIPTION OF THE DRAWINGS

The above and other embodiments of the present invention may be more fully understood from the following detailed description, taken together with the accompanying drawing, wherein similar reference characters refer to similar elements throughout, and in which:

FIG. 9 is a perspective view of another embodiment of an assembled security device;

FIG. 10 is an end plane view of the device;

FIG. 13 is a top plane view of the device;

FIG. 14 is a perspective view of a surround;

FIG. 15 is a crosssectional view of the retaining pin;

FIG. 16 is a top plane view of the adjustment cable;

FIG. 17 is a side plane view of the adjustment cable;

FIG. 18 is a side cut away view of the adjustment of the locking surround;

FIG. 19 is a rear plane view of the locking surround;

DESCRIPTION OF A PREFERRED EMBODIMENT

Figure 1:
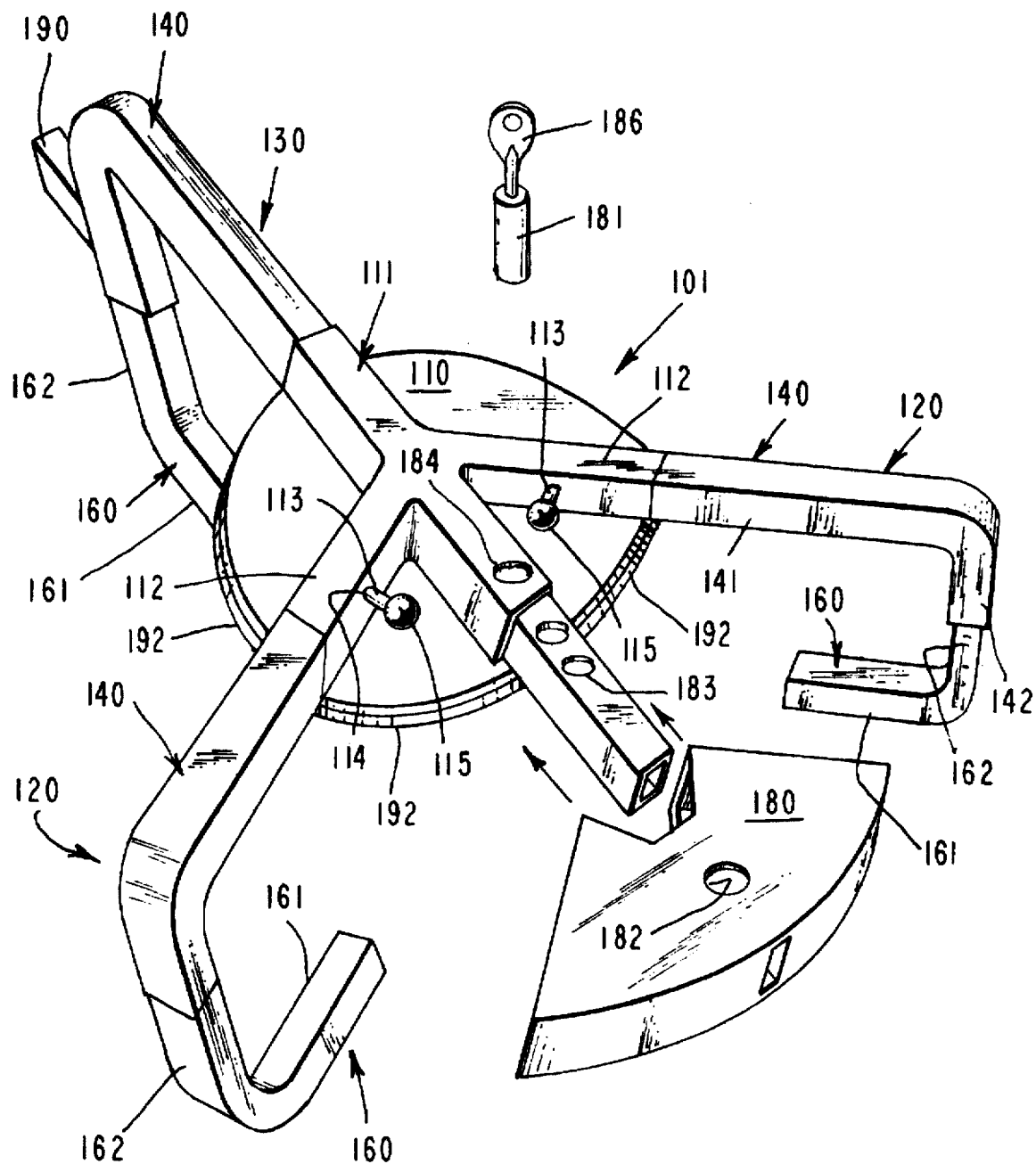
FIG. 1 is a perspective view of the entire security device partially assembled.

Referring now to the drawing, FIG. 1 shows a partially assembled security device according to the invention. This device is assembled of adjustable width legs which may be mounted on a selected wheel of a vehicle thereby rendering the wheel incapable of rotation. The material in the preferred embodiment is case hardened steel.

Figure 2:
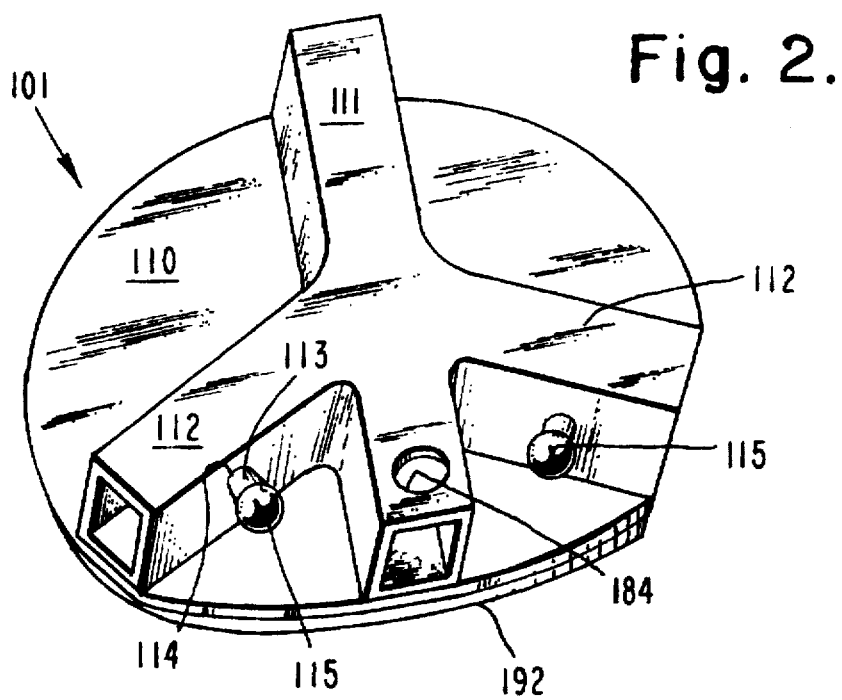
FIG. 2 is a perspective view of the central body of the preferred embodiment.

FIG. 2 depicts the central body, generally designated 101, fabricated of a base plate 110 of a size to cover the wheel mounts, rendering them inaccessible upon installation of the device. A traverse surround channel 111 and at least two other surround channels 112 are mounted on one side of the base plate 110. A pad 192 to protect the hub or wheel cover of the wheel may be mounted on the other side of the base plate 110. The cross section of the channels in the preferred embodiment is selected to be square because it presents a non-rotatable configuration. A retaining pin 114 is mounted on each surround channel 112 with one end urged into the channel by a retainer spring 113. A retainer handle 115 is mounted on the other end of the retainer pin 114 accessible to the user to pull the end of the retainer pin 114 out of the surround channel 112. A lock channel 184 is formed in the traverse surround channel 111.

Referring to FIG. 1, complete assembly of the security device requires the user to install the shield 180 over the retaining pin handles 115 and align the lock seat 182 with the lock channel 184 in the traverse surround channel 111 thereby allowing the locking pin 181 to be inserted and locked in place. The retaining pin handles 115 are now rendered inaccessible to the user until the locking pin 181 is removed with the key 186 and the shield 180 removed to allow disassembly and removal of the entire device from the wheel.

A surround 120 with an adjustable U-shaped end is mounted in each surround channel 112 and held in place by the retaining pin 114. Several holes forming retaining pin receiving channels 143 are provided to accommodate a range of tires having a different diameter. A locking surround 130 is mounted in the traverse surround channel 111 and held in place by the locking pin 181.

Figure 3:
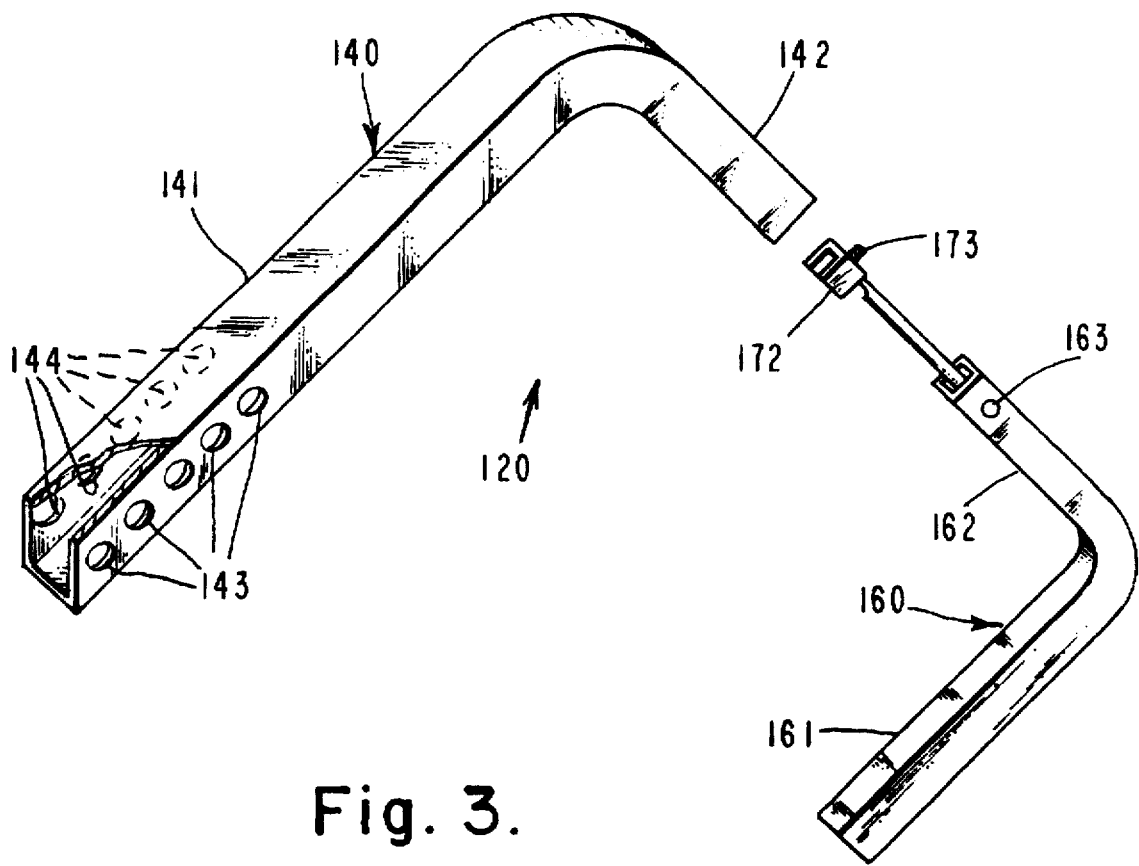
FIG. 3 is a perspective view of a disassembled surround.

Now referring to FIG. 3, each surround 120 is fabricated in two sections, a main leg 140 and a subordinate leg 160. The cross section of the subordinate leg 160 is selected to be insertable at least into the short portion 142 of the main leg 140. When assembled into a surround, one end of the surround is generally formed in a U shape to be installed over the tread of the tire mounted on the wheel of the vehicle. The first end 161 of the subordinate leg 160 is fabricated to be of a length whereby the first end 161 will engage the tire rods or wheel shock tower of the vehicle upon which the wheel is mounted thereby inhibiting rotation of the wheel with the device installed on the wheel.

The width of the U shaped end is adjustable so that the surrounds can be mounted over the tread of various width tires.

The main leg 140 is fabricated with a long portion 141 and a short portion 142. A plurality of holes forming retainer pin receiving channels 143 are fabricated in the long portion 141 and engagable by the retainer pin 114 when inserted into the surround channel 112.

A plurality of holes forming width adjustment channels 144 are also fabricated in the long portion 141 of the main leg 140 in a preselected position so as to not interfere with the insertion of the retaining pin 114 into the retainer pin receiving channels 143. The placement of the width adjustment channels 144 is selected to be within the surround channels 112 or the traverse surround channel 111 so as to not be accessible when the device is installed on the wheel of the vehicle. In the preferred embodiment, the retainer pin receiving channels 143 and the width adjustment channels 144 are aligned so that the surround may be used in either surround channel 112. The non-interference being accomplished by the shape of the adjustable end connector 172 shown below.

Figure 4:
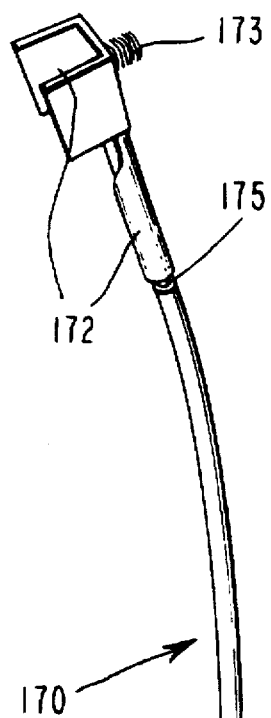
FIG. 4 is a perspective view of a cable assembly.

A width adjustment cable assembly 170 shown in FIG. 4 is fabricated of twisted steel cable 175 which may be covered with a plastic protective cover 174. An end connector 171 is mounted on one end of the cable 175. The end connector 171 is fabricated as a loop 193 to be attached by a mounting pin 163 to the subordinate leg 160. The mounting pin 163 is attached near the second end 162 so that the pin is inaccessible even at the maximum width adjustment setting of the surround. An adjustable end connector 172 is mounted on the other end of the cable 170. The U shape of the adjustable end connector 172 allows the retaining pin 114 to be inserted into a traverse retaining pin receiving channel 143 aligned with the width adjustment channel 144 currently holding the set screw 173.

Figure 5:
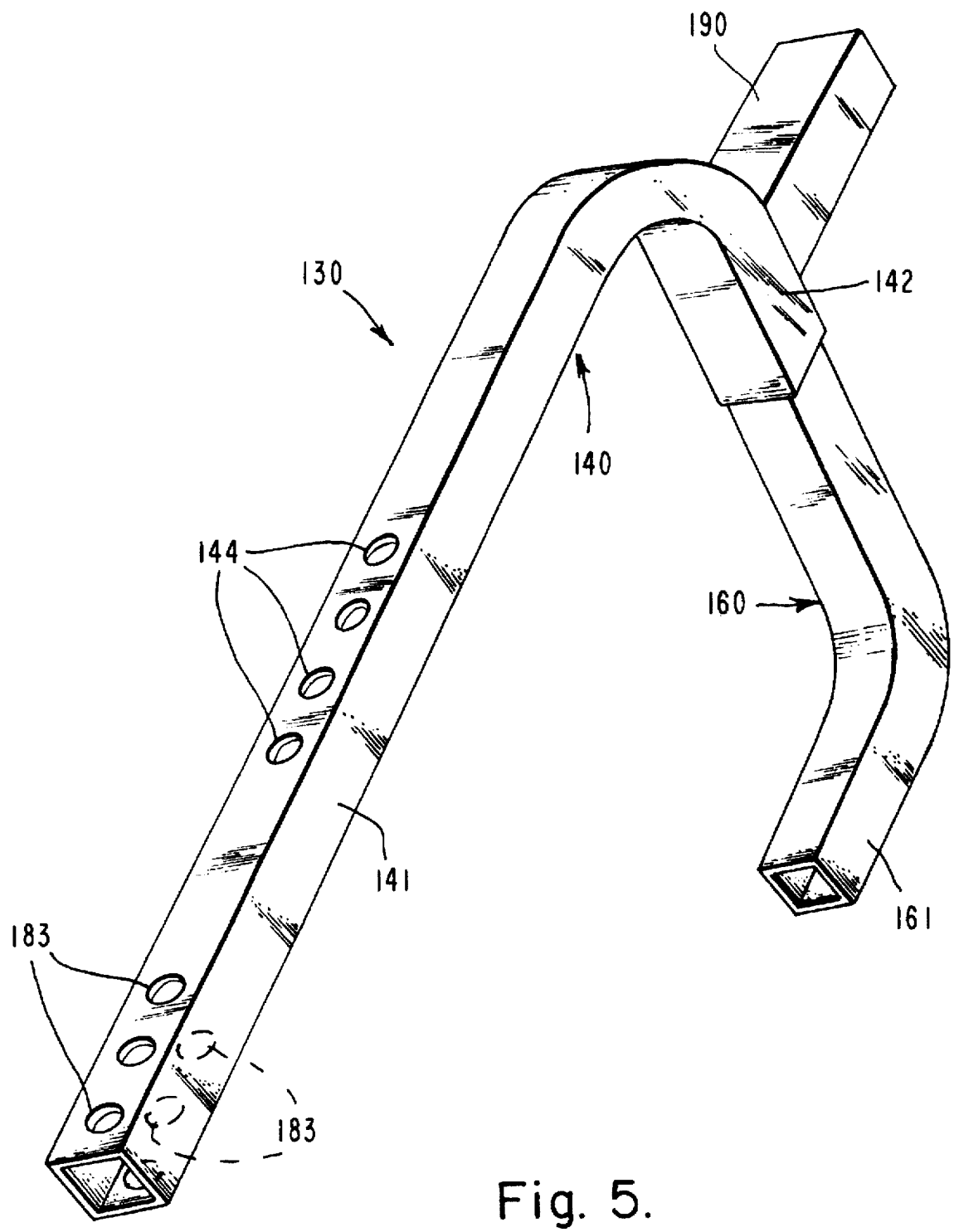
FIG. 5 is a perspective view of a locking surround.

A locking surround 130 is shown in FIG. 5. The long portion 141 of the main leg 140 is elongated and locking pin channels 183 are fabricated to be alignable with the lock channel 184 in the traverse surround channel 111 so as to receive the locking pin 181. A plurality of width adjustment channels 144 are fabricated at a selected position so that the set screw 173 is not accessible after the locking surround 130 is inserted into the traverse surround channel 111.

A spike 190 may be mounted on the short portion 142 to further inhibit rotation of the wheel.

Figure 6:
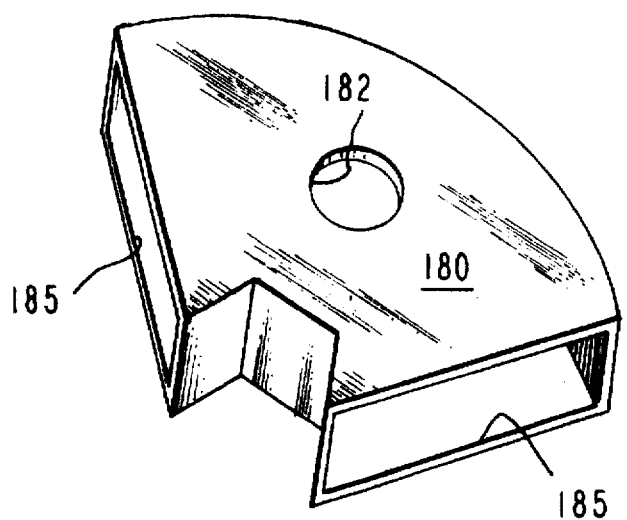
FIG. 6 is a perspective view of the shield.

Now referring to FIG. 6, there is depicted a shield 180 which is slideably mountable over the elongated end of the locking surround 130. Retainer pin handle cover chambers 185 are formed to render the retainer pin handles 115 inaccessible when the shield 180 is fully installed. A lock seat 182 is formed in the shield 180 at a location which aligns with the lock channel 184 in the traverse surround channel 111 of the central body 101 and alignable with one of the locking pin channels 183.

The device is easily installed by first adjusting the width of the U-shaped end of each surround to the width of the tire on the vehicle to be secured. Two of the surrounds may be retained in the central body 101 at a retaining pin receiving channel 143 compatible with the circumference of the wheel. This partially assembled unit may be placed over the wheel with one surround supporting the weight of the assembly. The locking surround may now be inserted into the traverse surround channel 111.

With the three surrounds mounted in the central body 101, the shield 180 is slideably mounted over the extended portion of the locking surround 130. The lock seat 182 is aligned with the lock channel 184 and one of the locking pin channels 183 so that the locking pin 181 may be inserted and secured in place thereby locking the device on a selected wheel of the vehicle.

Figure 7:
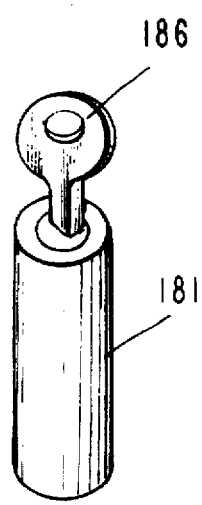
FIG. 7 is a perspective view of a prior art lock.

The lock pin shown in FIG. 7, is commercially available. The lock tumbler chamber spins freely without the key inserted so it cannot be forced open without insertion of the key. This arrangement of one point locking without special tools greatly increases the ease of installation and removal of the device making it attractive for the user to install even when the vehicle is left unattended for only a short period of time.

Figure 8:
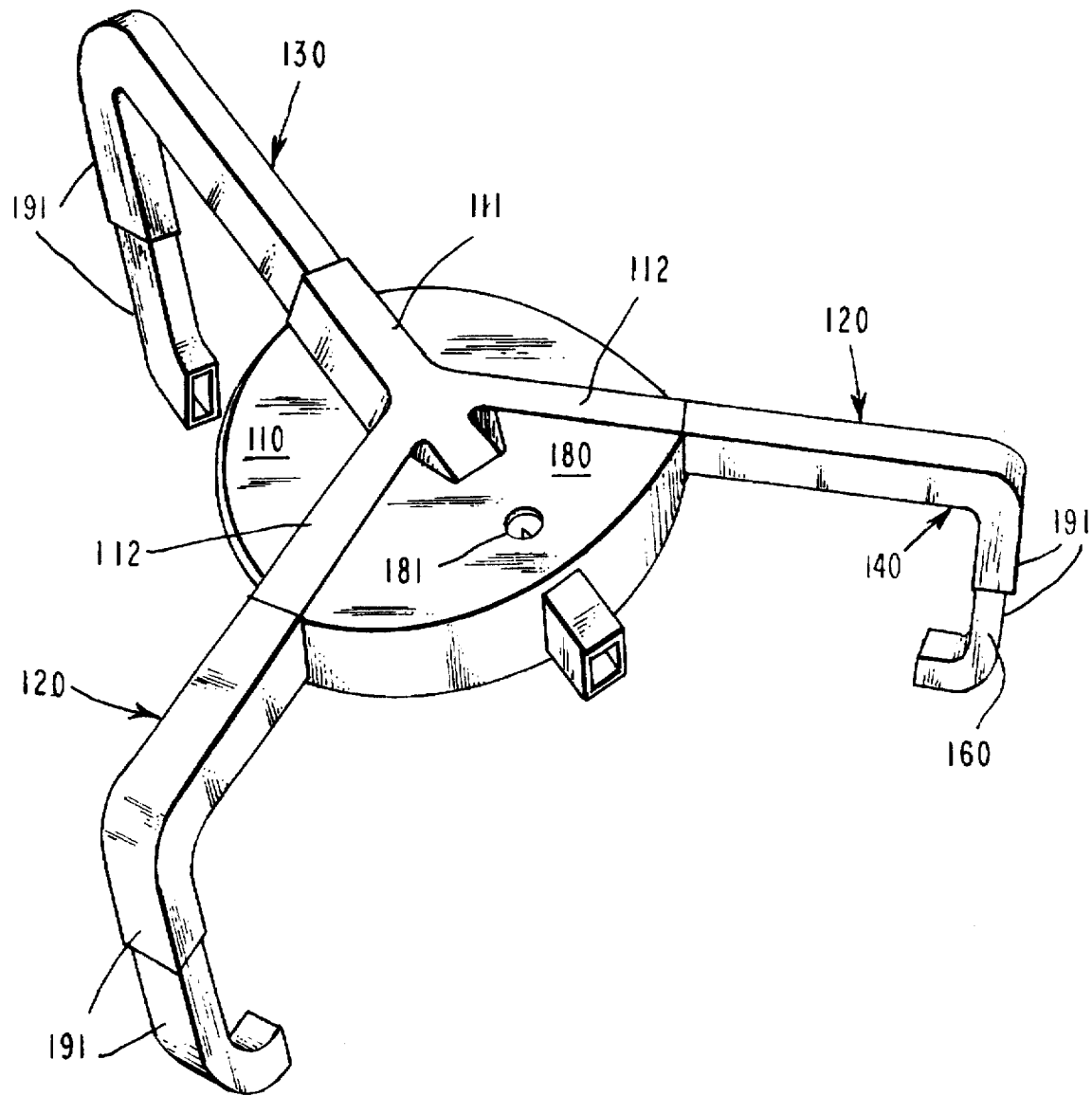
FIG. 8 is a perspective view of a safety device according to the invention.

FIG. 8 depicts yet another embodiment of the device wherein the security legs with elongated first ends 161 of the subordinate legs 160 are replaced with safety legs having a short first end and a traction surface 191 formed on the outside, exposed surface of the surround to assist in increasing the traction of the wheel when the vehicle is maneuvered on a slippery surface. The portion of the surrounds which cover the tread of the tire may be fabricated of a low profile so as to not impede the rotation of the wheel.

FIGS. 9 and 10 illustrate yet another embodiment of the device. A central body generally designated 201 is fabricated of a base plate 210, a traverse surround channel 211 and at least two other surround channels 212 which extend beyond the edge of the base plate 210. A pad 192 may be used to protect the hub or wheel cover of the vehicle. As taught above, a retaining pin 214, shown in more detail in FIG. 15., holds the surrounds in the surround channels 212. The retainer handle 215 is external to the surround channels 212. In this embodiment, a shield 280 is configured to mount over the retainer handles 215 before the locking surround 230 is inserted into the transverse channel 211.

Now referring to FIG. 14, each surround 220 is fabricated in two sections, a main leg 240 and a subordinate leg 260 insertable at least into the short portion 242 of the main leg 240. The first end 261 of the subordinate leg 260 is fabricated to be of a length whereby the first end 261 will inhibit rotation of the wheel.

The main leg 240 is fabricated with a plurality of adjustment channels 244 whereby the width of the U shaped end can be mounted over the tread of various width tires. A plurality of holes forming retainer pin receiving channels 243 are fabricated in the long portion 241.

A width adjustment cable assembly 170 shown in FIGS. 16 and 17 is fabricated of twisted steel cable 175 which may be covered with a plastic protective cover 174. An end connector 171 is mounted on one end of the cable 175. The end connector 171 is fabricated as a loop 193 to be attached by a mounting pin 263 to the subordinate leg 260 as illustrated in FIGS. 18 and 19 of the locking surround 230.

A spike 290 may be mounted on the short portion 242 to further inhibit rotation of the wheel.

Figure 11:
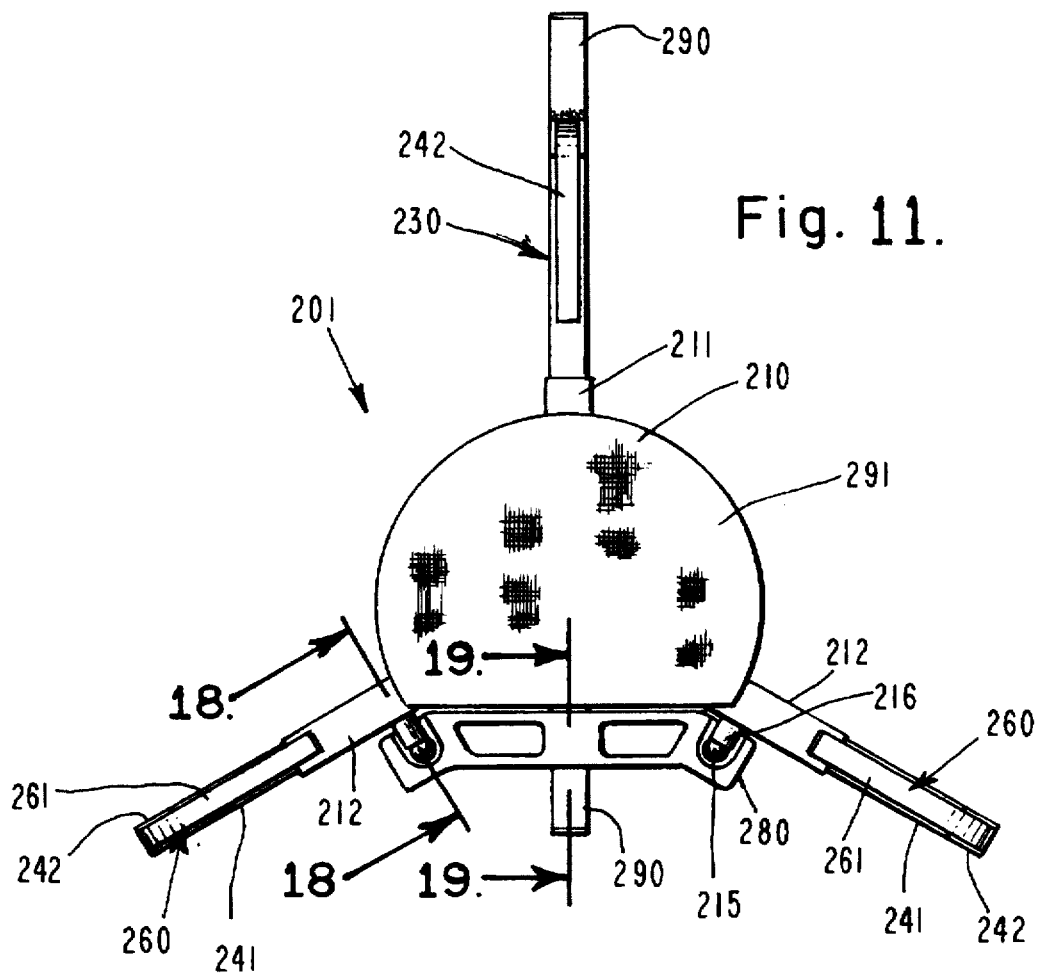
FIG. 11 is a bottom plane view of the device.

Now referring to FIG. 11, there is depicted a view of shield 280 which is slideably mountable over the retaining pin handles 215 rendering them inaccessible.

FIG. 13 illustrates the top view of the shield 280 showing the lock seat 282.

Figure 12:
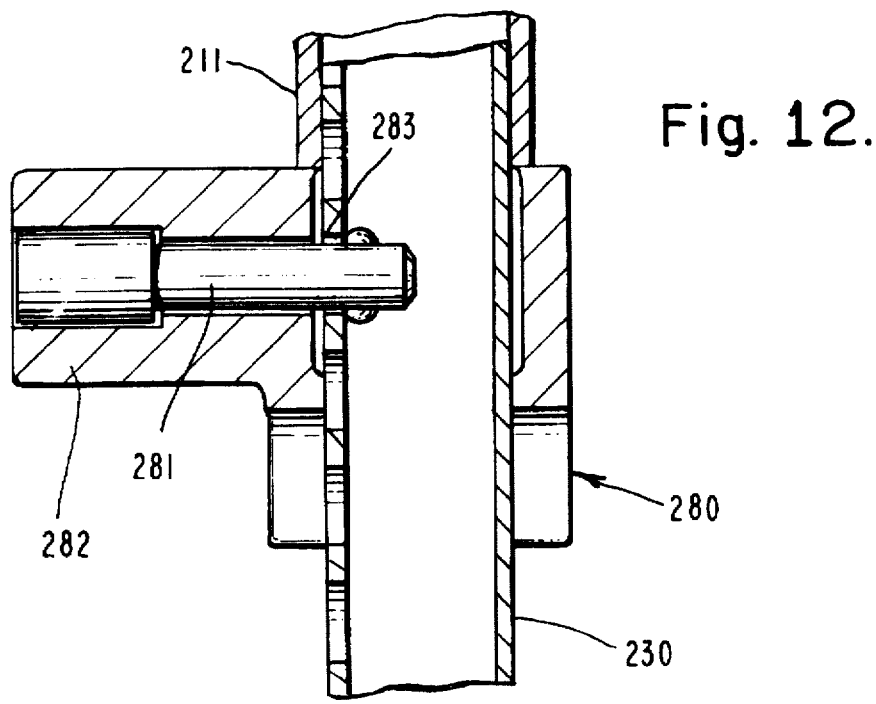
FIG. 12 is a crosssectional view.

FIG. 12 is a cross sectional view of the lock seat 282 with locking pin 281 engaging a locking pin channel 283.

FIG. 15 illustrates the detail of the retaining pin assembly which in this embodiment includes a retaining pin stand tube 216 within which is mounted the retaining pin 214, retaining pin spring 213 and providing a seat for the retaining pin handle 215. The tube 216 performs the function of a mount when the shield 280 is installed over the retaining pin handles 215.

Figure 20:
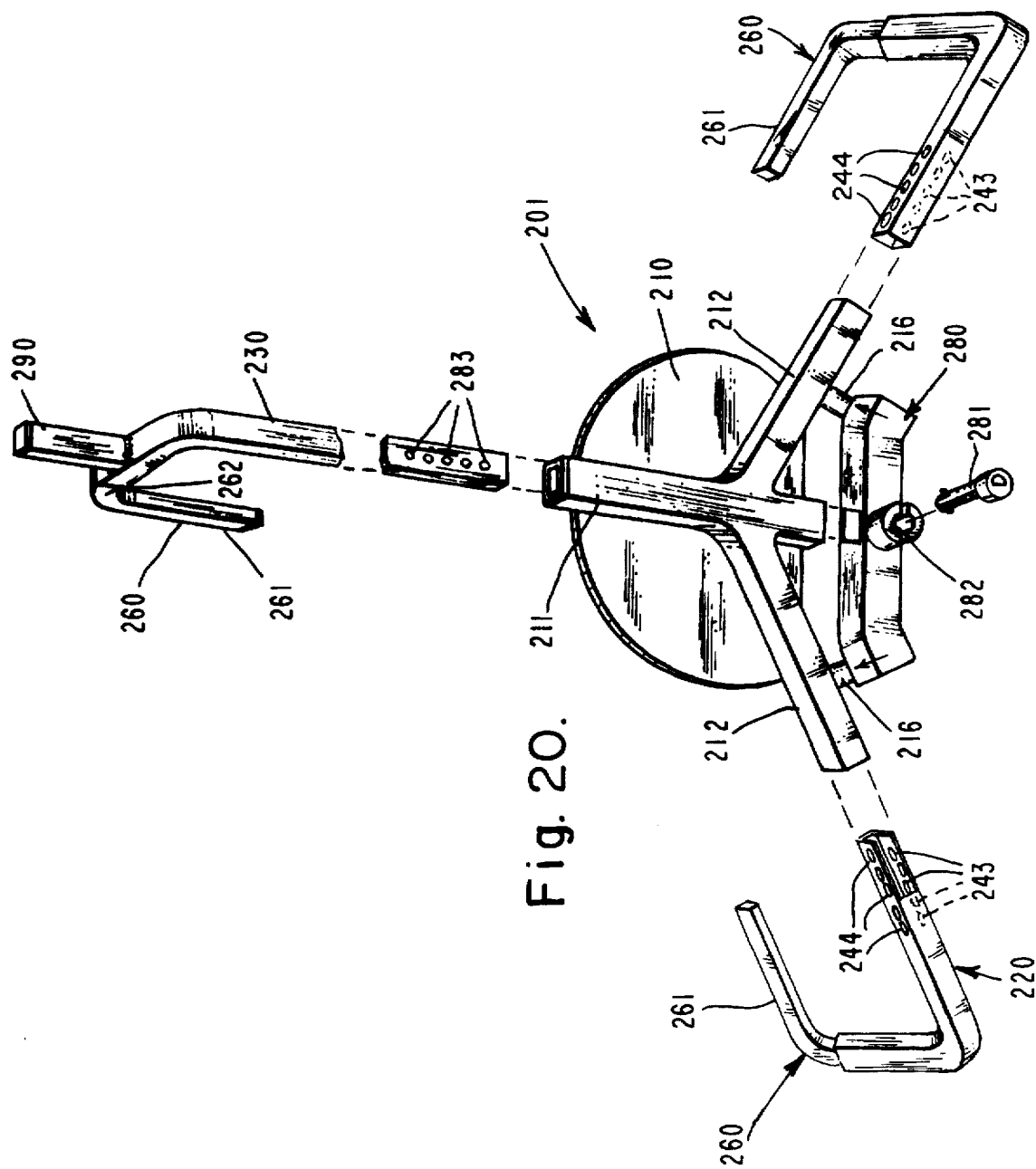
FIG. 20 is an exploded perspective view of the security device.

FIG. 20 illustrates the assembly of the device. Two of the surrounds comprised of 220 and 260 may be retained in the central body 201 with a retaining pin within the retaining pin tube 216. This partially assembled unit may be placed over the wheel with one surround supporting the weight of the assembly. The shield 280 may be mounted over the retaining pin tubes 216. The locking surround comprised of 230 and 260 may now be inserted into the traverse surround channel 211.

With the three surrounds mounted in the central body 201, the lock seat 282 is aligned with the lock channel 283 so that the locking pin 281 may be inserted and secured in place thereby locking the device on a selected wheel of the vehicle.

Since certain change may be made in the above apparatus without departing from the scope of the invention herein involved, it is intended that all matter contained in the above description, as shown in the accompanying drawing, shall be interpreted in an illustrative, and not a limiting sense.

What is claimed is:

1. A vehicle safety and security device removably attachable to a preselected wheel mounted on an axle of a vehicle, comprising, in combination:

a central body having a base plate of a preselected size and shape to cover the hub of said wheel and render said wheel mounting to said vehicle inaccessible;

a plurality of surround channels having a preselected, non-rotatable cross-section shape mounted on one side of said base plate, at least one said surround channel traversing said base plate;

a plurality of surrounds at least one insertably removable into each said surround channels which do not traverse said base plate, each surround formed with a U shaped end having width adjustment means thereby allowing each said U shaped end to be mounted over the tread of said wheel under the condition of being installed within a selected surround channel, each surround having a plurality of retaining channels formed remote from said U shaped end;

retaining means mounted on each surround channel engagable with at least one of said retaining channels thereby retaining said surround within said surround channels which do not traverse said base plate;

a locking surround insertably removable into said traversing surround channel, said locking surround formed with a U shaped end having width adjustment means thereby allowing said U shaped end to be mounted over the tread of said wheel under the condition of being installed within said traversing surround channel, said locking surround having a plurality of lock pin channels formed remote from said U shaped end;

a shield mountable over said retaining means whereby said retaining means are inaccessible; and, means for locking said locking surround in the installed position within said traversing channel by engaging one of said lock pin channels while also retaining said shield in a retaining means inaccessible position thereby preventing said vehicle from being moved until said means for locking is unlocked, said shield removed, said retaining means disengaged and the device removed from said wheel by the user.

2. A vehicle safety and security device removably attachable to a preselected wheel mounted on an axle of a vehicle, comprising, in combination:

a central body having:

a base plate having a first side and a second side, said base plate of a preselected size and shape to cover the hub of said wheel and render said wheel mounting to said vehicle inaccessible;

a plurality of spaced apart surround channels formed of a preselected, non-rotatable cross-section, mounted on said first side of said base plate, at least one surround channel traversing said base plate;

a retainer pin mounted on each surround channel which does not traverse said base plate and having a retainer spring mounted on said retainer pin thereby urging one end of said retainer pin toward the inside of said surround channel and a handle mounted on the outside end of said retainer pin whereby the user may withdraw said retainer pin from inside said surround channel;

a plurality of surrounds, with at least one being a locking surround, each surround having one end formed in a generally U shape end being adjustable to accommodate the width of a vehicle tire mounted on said wheel, fabricated of a preselected non-rotatable cross-section tubing insertably removable into at least one of said surround channels, each said surround having:

a main leg formed in a general L shape, having a preselected length short portion and a long portion, having a plurality of first walls forming spaced apart retainer pin receiving channels along a preselected portion of said long portion and a plurality of second walls forming spaced apart width adjustment channels along said long portion in a preselected location so as to not interfere with said retainer pin receiving channels;

a subordinate leg of a preselected length formed in a general L shape having a preselected cross-section, having a first end insertably removable into said short portion of said main leg and a second end of a preselected length whereby said second end will engage the tire rods mounting said wheel to said vehicle upon the condition of the device being mounted on said wheel;

a cable assembly having a first end formed as a connector mountable inside said subordinate leg, a mounting pin attaching said connector to said subordinate leg at a preselected location and a second end formed as an adjustable end connector insertable inside said main leg along said width adjustment channels;

said adjustable end connector having a set screw removably engagable with at least one said width adjustment channel upon the condition of the user inserting said adjustable end connector and said subordinate leg into said main leg through said short portion thereby forming the U shaped end of the surround at a desired width which can be mounted over the tread surface of said tire upon the insertion of said long portion into one of said surround channels upon the condition of said central body being adjacent to the hub of said wheel, the user thereafter engaging said retainer pin into one of said retainer pin receiving channels;

said locking surround further comprising a plurality of third walls forming spaced apart locking pin receiving channels along a preselected, extended portion of said long portion of said main leg;

a shield engagable with said locking surround under the condition of said locking surround being inserted into said traversing surround channel, said shield mountable over said retainer pin handles thereby rendering said retainer pin handles inaccessible; and, a locking pin engagable through said shield into one of said locking pin receiving channels.

3. A device as in claim 2 further comprising:

a pad mounted on said second side of said base plate thereby protecting the hub or any wheel cover mounted on said wheel from damage from installation or removal of the device.

4. A device as in claim 2 wherein:

said cable assembly first end is formed as a loop and attached to said subordinate leg by said mounting pin at a point where said subordinate leg is insertable into said main leg so that said mounting pin is not accessible upon the condition of said device being mounted on said wheel.

5. A device as in claim 2 further comprising:

a spike mounted on the outside of the U shaped end of said locking surround to further inhibit rotation of said wheel under the condition of the device installed on said wheel.

6. A device as in claim 2 further comprising:

a traction enhancing surface mounted on a surface of said surrounds opposite a surface in contact with the tread of the tire.

* * * * *